(12) United States Patent
Larson (10) Patent No.: US 6,426,694 B1
(45) Date of Patent: Jul. 30, 2002

(54) METHOD AND APPARATUS FOR DETERMINING VEHICLE SPEED (75) Inventor: Gerald L. Larson, Fort Wayne, IN (US)

(73) Assignee: International Truck Intellectual Property Company L.L.C., Warrenville, IL (US)

(*) Notice: Subject to any disclaimer, the term of this patent is extended or adjusted under 35 U.S.C. 154(b) by 0 days.

(21) Appl. No.: 09/948,085

(22) Filed: Sep. 6, 2001

Related U.S. Application Data (62) Division of application No. 09/634,166, filed on Aug. 9, 2000, now Pat. No. 6,313,742.

(51) Int. Cl.[7] ................................................ B60Q 1/00
(52) U.S. Cl. .......................... 340/441; 340/444; 701/29
(58) Field of Search ................................. 340/441, 442, 340/438, 670, 444; 324/160, 161; 73/178, 488; 702/145, 142; 701/93, 30, 29

(56) References Cited

U.S. PATENT DOCUMENTS

| | | | | |
|---|---|---|---|---|
| 4,773,011 A | * | 9/1988 | VanHoose | .................. 73/146.2 |
| 5,557,552 A | * | 9/1996 | Naito et al. | .................. 340/438 |
| 5,569,848 A | * | 10/1996 | Sharp | ......................... 73/146.2 |
| 6,232,767 B1 | * | 5/2001 | Kawase | ....................... 340/441 |

* cited by examiner

Primary Examiner—Anh V. La
(74) Attorney, Agent, or Firm—Jeffrey P. Calfa; Neil T. Powell; Dennis Kelly Sullivan (57) ABSTRACT A system and a method for generating a calibrated speedometer signal is provided utilizing a global positioning unit and wheel speed monitoring units. Side to side comparison of wheel rotational speeds allows detection of vehicle turns. Speed estimation is made from the global positioning unit during straight line operation of the vehicle. The speed estimate is used to calibrate the raw speed signal provided by averaging the wheel rotational speeds as measured by the wheel speed monitoring units.

8 Claims, 5 Drawing Sheets

FIG. 4C

METHOD AND APPARATUS FOR DETERMINING VEHICLE SPEED

This application is a divisional application of Ser. No. 09/634,166, filed on Aug. 9, 2000, now U.S. Pat. No. 6,313,742.

BACKGROUND OF THE INVENTION

1. Technical Field

The present invention relates to a method and apparatus for determining vehicle speed and more particularly to a method and apparatus for calibrating vehicle speedometer signals.

2. Background to the Invention

Poor wheel alignment and tire under inflation are factors contributing to premature tire wear and poor vehicle handling. A system which alerts a vehicle operator of low tire pressure and misalignment would help control one of the factors contributing to the accelerated wear of tires. Unfortunately, the direct provision of pressure sensors in wheels to monitor tire pressure has proven unreliable and expensive. Pressure sensors mounted in wheels are subjected to a hostile environment of high temperatures, road shock and high rotational velocities. The data transmission linkage from the wheel to the vehicle is necessarily indirect and adds expense to the system, and it requires an independent power supply, such as a battery, which must periodically be removed from the tire for replacement.

Tire pressure directly relates to the rolling radius of a tire, which shrinks with reduced pressure. As the tire's rolling radius is compressed, side wall flex increases causing the tire's temperature to increase. Increased operating temperature of a tire promotes degradition of the synthetic rubber of the tire and results in excessive tire wear. As an alternative to measuring tire pressure, a wheel's rotational speed can also be measured as an indirect indication of tire under inflation. The increasingly widespread use of antilock braking systems (ABS) on cars and trucks affords a convenient source of wheel rotational speed information which can be used to implement pressure monitoring methods involving wheel rotational speed monitoring.

U.S. Pat. No. 6,064,936 to Nakajima describes a system utilizing an ABS to provide inputs for tire pressure monitoring system. While increases in one wheel's velocity suggest low inflation of the tire mounted on that wheel, other circumstances may exist which be the cause of a relative increase in wheel angular velocity. The Liu, et al. reference, U.S. Pat. No. 5,760,682 develops calibration coefficients to compensate for factors such as wheel slippage, rough road fluctuations, vehicle cornering, and uphill and downhill travel. Desirable though is a system which can identify different conditions affecting wheel rotational velocity so that the proper corrective steps may be taken.

Numerous patents relate specifically to the application of indirect tire pressure measurement using ABS wheel speed sensors on automobiles. With trucks additional issues are raised due to the much higher sidewall stiffness of tires compared to automobile tires (and consequent relatively lower sensitivity of rolling radius to tire pressure) and the differences in wheel layout used for trucks, for example 4×6 (a front steering axle with two tires with a rear driven axle carrying four tires) and 6×10 (a front steering axle with two rear driven axles, each with four tires) wheel arrangements. Truck suspensions are designed for maximum load conditions and loading varies much more than for passenger autos. Vehicle speed for trucks is commonly measured by a tachometer. The tach is attached to track the rotational velocity of a drive shaft installed between the vehicle's transmission and a rear end differential. As a result measured velocity is proportional to the average rotational velocity of the driven wheels. ABS wheel sensors provide an alternative source of data with which to generate vehicle speed, among values for other operating variables.

SUMMARY OF THE INVENTION

The objects, features, and advantages of the invention will be apparent from the written description that follows. The invention provides an apparatus and a method for detecting compromised vehicle wheel and tire operating characteristics. Among the conditions indication of which can be detected are out of round new tires, under pressure tires, poor front wheel alignment and either a longitudinally or latitudinally off center load. The invention provides that an instantaneous rotational velocity signal for each wheel is generated, typically using an existing antilock braking system (ABS). Wheel speed is compared against an instantaneous indication of vehicle speed, which is usually, but not necessarily, generated from the rotational speed of the drive shaft take-off from the vehicle's transmission.

Operation of the method and system requires calibrating newly mounted tires. As part of the calibration process it is determined if each newly installed tire is within tolerances for the tire and if the front tires appear to be correctly aligned. Calibration is done to generate a scalar relating wheel rotational velocity for each wheel to straight line vehicle speed. Once scalars have been obtained for each wheel they are stored, and then adjusted for estimated wear of the tires as a function of distance traveled. To obtain these numbers, the distance traveled on the tires currently mounted on the wheels and distance traveled since a current trip began are tracked. Vehicle speed can be calibrated utilizing the global positioning system, which involves installation of the appropriate sensor on the vehicle.

Operational monitoring of the wheels includes initializing the trip odometer, collecting wheel speeds, and sampling vehicle speed. Tire radius and tolerance data are generated as a function of estimated wear and tire temperature. Tire temperature is in turn a function of ambient temperature and trip distance. Rotational velocity of the wheels are estimated as functions of vehicle speed and the updated tire radius data. Rotational velocity for each wheel is subtracted from estimated velocity and the difference is compared to the allowed, updated tolerances. A possible pressurization error is indicated if one wheel departs outside of the updated tolerances from estimated rotational velocity.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
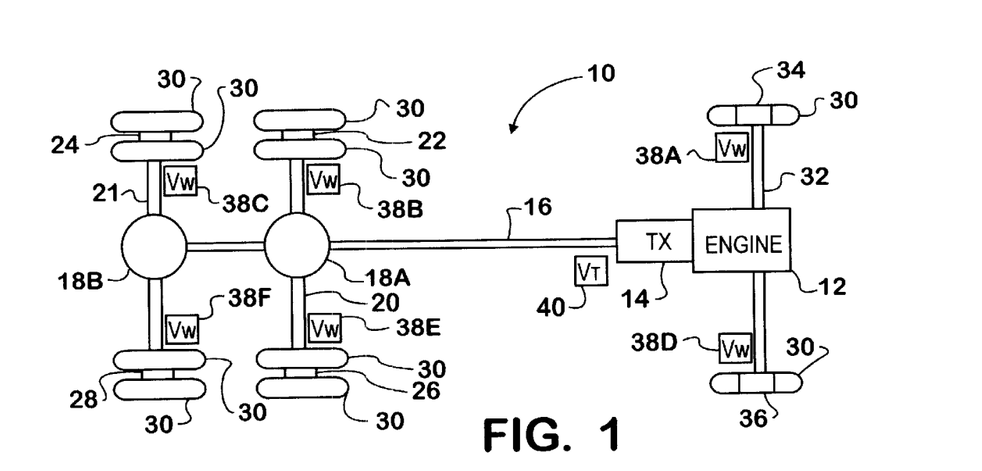
FIG. 1 is a schematic view of a vehicle drive train.

Referring now to the drawings, a preferred embodiment of the invention and its manner of use will be described. FIG. 1 illustrates a vehicle drive train 10 to which the system and method of the invention are applied. Vehicle drive train 10 provides for the application of motive power generated by an engine 12 to each of a plurality of rear drive wheels 22, 24, 26 and 28. Engine 12 applies power directly to a transmission 14, which includes a plurality of step down gears. Transmission 14 turns a drive shaft 16 which is coupled between the output end of transmission 14 and forward rear differential 18A and aft rear differential 18B. Forward rear differential 18A drives wheels 22 and 26 mounted on forward rear axle 20 and aft rear differential 18B drives wheels 24 and 28 mounted on aft rear axle 21. Wheels 22 and 26, and wheels 24 and 28 are mounted on the outside ends of rear axles 20 and 21, respectively. Forward left and right steering wheels 34 and 36 are mounted on the outside ends of forward steering axle 32. Each of the rear drive wheels 22, 24, 26 and 28 support two tires 30. Forward wheels 34 and 36 each have one tire 30. Vehicle drive train 10 is illustrated as an 8×10 configuration (i.e. two driven axles) commonly found on trucks, but the invention is equally applicable to a 4×6 configuration (i.e. one driven axle).

The vehicle incorporating vehicle drive train 10 is equipped with an antilock braking system (ABS) which provides wheel speed sensors for each wheel. These include a wheel rotational speed sensor 38A positioned adjacent and on left forward wheel 34. Wheel rotational speed sensor 38B is adjacent drive wheel 22. Wheel rotational speed sensor 38C is adjacent drive wheel 24. Wheel rotational speed sensor 38D is adjacent wheel 36. Wheel rotational speed sensor 38E is adjacent drive wheel 26. Wheel rotational speed sensor 38F is adjacent drive wheel 28. Vehicle speed may be generated from a tachometer 40 mounted to the output end of transmission 14. The signal generated from tachometer 40 represents an average of the rotational velocity of the vehicle's rear wheels 22, 24, 26 and 28. Vehicle speed is generated by factoring the tachometer's output by a standard wheel radius and the step down ratio of the rear differentials to produce a desired speed. However, as is well known, rear drive wheels are subject to slippage during acceleration (and deceleration) and in climbing and descending from hills, among other situations. Accordingly, the speed signal produced by tachometer 40 is not the most accurate way to measure speed, though it remains commonly employed. As will be described below, one embodiment of the invention eliminates the vehicle speed tachometer 40 and substitute the ABS sensors 38A–F as the data gathering element in a speed signal generating system.

Figure 2:
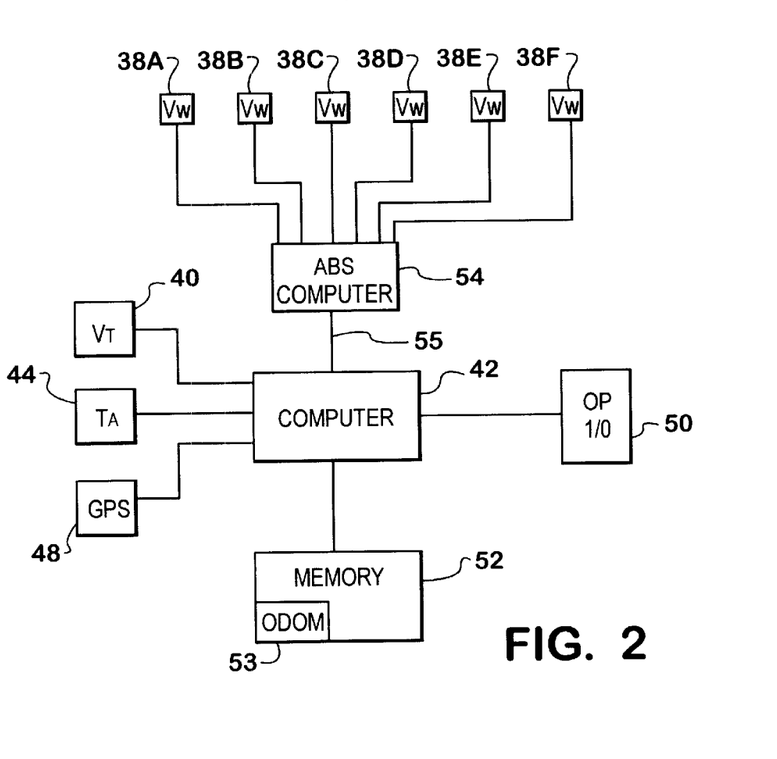
FIG. 2 is a block diagram of a data processing system and connections to external data inputs used in practicing the invention.

FIG. 2 is a block diagram illustrating the component elements of the present invention. A wheel and tire condition monitoring computer 42 is connected to receive data inputs from the vehicle speed tachometer 40, an ambient temperature measuring thermometer 44 and a global positioning sensor (GPS) 48. Tachometer 40 and GPS 48 are optional components. Computer 42 is equivalent in power to common personal computers contemporary to the date of preparation of this application, although the computational burdens entailed by the method of the invention can be effectively carried out on a minimal system based on an embedded micro computer system. Computer 42 requires some writeable, non-volatile memory 52 for the storage of long term data and programs. In addition, computer 42 is connected to an antilock braking system computer 54 whereby computer 42 reads wheel rotational speeds (or output pulses) passed through from wheel rotational sensors 38A–F. (For a 4×6 drive train configuration there are only four rotational sensors.) The functions of ABS computer 54 and computer 42 could be combined. However, given that the ABS computer must give priority to the execution of antilock braking functions, prudence suggests the use of separate computers. The data link 55 from ABS computer 54 to computer 42 is preferably provided by a link conforming to the SAE J1939 standard. Computer 42 must be able to provide warning signals to an operator and accordingly the computer is attached to an operator input/output interface 50. I/O interface 50 also allows the input of tire data at the time of installation of new tires 30 on a vehicle. The stored data in memory 52 includes odometer registers 53.

I/O interface 50 includes warning indicators mounted within a truck cab which may emit aural warnings or include warning lights for the indication of particular problems with particular wheels. The interface includes a numerical keypad or other interface for the entry of data relating to tires for each wheel of the vehicle. The minimum data to be entered include tire size, tread depth, mileage when installed and manufacturer. Wear profiles for each tire against distance traveled are supplied in a data base indexed by manufacturer for operation at rated inflations and loads. To accommodate replacement of a tire, positions are also entered. Upon installation, a base mileage is saved for projecting tire rolling radius over the life of the tires. Data entry initiates a calibration algorithm function to obtain and store new tire rolling radius for each tire and to calibrate the vehicle odometer and speedometer.

Figure 3:
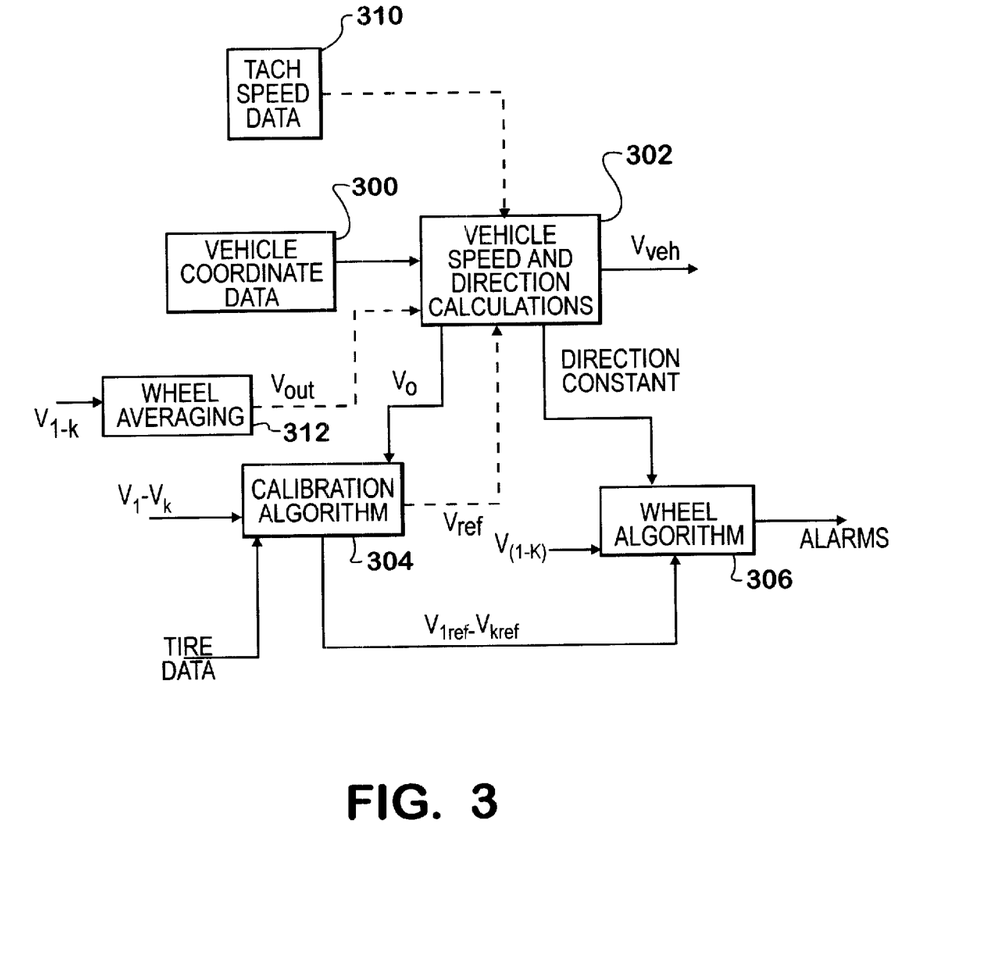
FIG. 3 is a data flow diagram.

FIG. 3 is a data flow diagram illustrating data manipulation steps for two preferred embodiments of the invention. A highly accurate, more expensive version of the system relies on vehicle geographical coordinate data 300, preferably supplied by the global positioning sensor 48.

If available, vehicle coordinate data 300 is passed to vehicle speed and direction calculation at algorithm 302. Coordinate data 300 is refreshed on a periodic basis, e.g. once a second. A minimum vehicle speed will support consistently reliable calculations of velocity. At the time of filing of this patent a speed of 50 k.p.h. is adequate. Improved accuracy in the global positioning system will allow for determination of vehicle speed and direction at lower speeds. Sampled speed over consecutive data samples is a direct matter of determining the distance between successive sampled location coordinates and dividing by the elapsed time.

It will now be obvious to those skilled in the art that such a direct calculation does not allow for the possibility that the vehicle followed a path other than the most direct one between successive locations corresponding to GPS 48 initiated inquiries. Vehicle turns, whether turns along a highway at a sustained velocity, or events involving an actual change of speed, will be reflected by changes in speed determined by the vehicle speed and direction calculation algorithm 302 if using GPS data. In the first case, the detected change in speed may not be the product of an actual change in vehicle velocity. Thus the calculations of calibration algorithm 304 and wheel algorithm 306 depend, primarily, on the vehicle following a constant direction. Substantially unvarying vehicle speed for a sustained period, for example 2 minutes, is taken as indicating a constant vehicle direction, permitting full execution of the calibration and wheel algorithm 304 and 306. If a vehicle has a steering position sensor, then an input from that sensor can be used to determine straight line operation.

Calibration algorithm 304 is entered upon installation of one or more new or replacement tires. Data is entered relating to all replacement tires, and their positions. The vehicle is then driven at a constant speed on a straight stretch of road allowing speed data $V_o$ to be developed and the individual wheel speed signals ($V_{1-k}$) be generated. As described below, individual wheel signals are analyzed to determine conformity of the newly fitted tire(s) to expected values.

Once wheel speed signals are brought into conformance with expected operating characteristics, the calibration algorithm 304 passes wheel by wheel velocity reference values $V_{1ref}$–$V_{k\ ref}$ to the wheel algorithm for use in detecting later occurring changes to tires, such as premature wear or low pressure. The reference values are found by applying the following general equation to the specific cases:

$$V_{iref} = 1/t(\partial V_i dt) \text{ for } 0, T \quad (1.)$$

The calibration algorithm 304 may supply a vehicle speed reference value $V_{ref}$ to be used for calibration of the speedometer and odometer signals. $V_{ref}$ is tailored to the specific tire set installed on the vehicle and may be subject to further correction factors relating to tire wear. The use of $V_{ref}$ may depend upon whether GPS data is available on the vehicle.

Alternative sources for vehicle speed may be utilized where no GPS unit 48 is provided on a vehicle. Tachometer 40 is one source of speed data 310. As described above, tachometer data represent an average of drive wheels' rotational velocity. Wheel speed averages 312 can supply a velocity signal ($V_{out}$) which is an average of wheel rotational speeds for all of the which, i.e.

$$V_{out} = (S_{i=1}^{K} v_i)/K \quad (2.)$$

If one signal of the wheel rotational signal departs by more than a threshold deviation from the average for the remaining wheel rotational speed signals, that value may be dropped from the calibration of vehicle speed before the value is passed to vehicle speed and direction calculation algorithm 302 and application to the calibration algorithm 304. Vehicle direction determinations need not change greatly with changes in the source of the velocity signal. Neither the tachometer unit 40 or the GPS unit 48 is strictly required to practice the invention and either or both may be eliminated from the vehicle. Use of GPS unit 48 has a number of benefits however including increased accuracy in the calculations called for and as a way of updating calibration of the vehicle speedometer and odometer. Where both are eliminated vehicle speed is determined using equation 2. Where the GPS 40 is available, vehicle speed is still determined using equation 2, but the result is calibrated using GPS 40 data.

Once calibration is complete the wheel algorithm 306 is initiated, utilize the raw wheel rotational velocity signals $V_{1-k}$, $V_{1\ ref}$ through $V_{k\ ref}$ and indication of the vehicle traveling in constant direction.

Figure 4A:
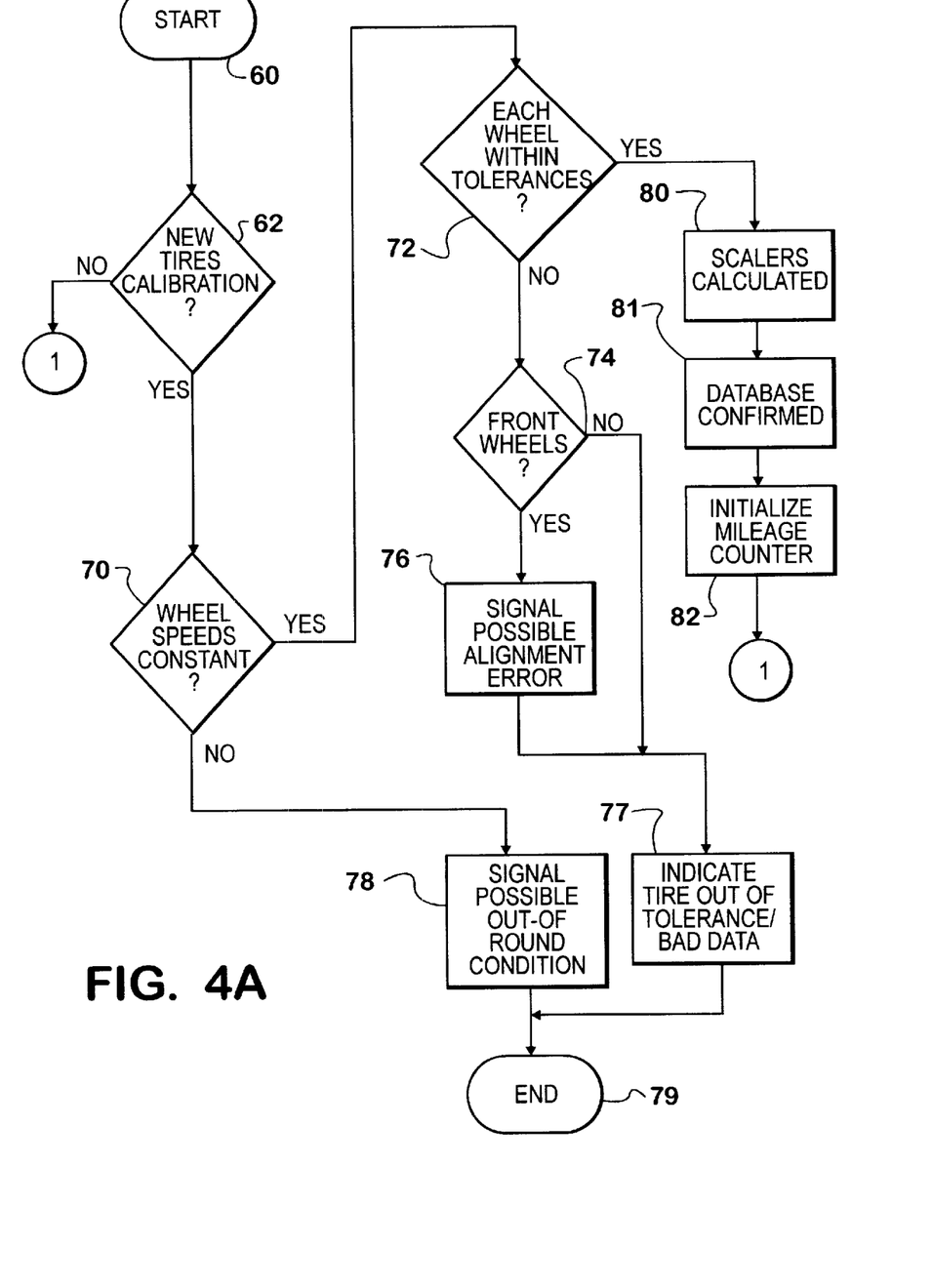
FIGS. 4A–C are a flow chart of an algorithm used in practicing the invention.
Figure 4B:
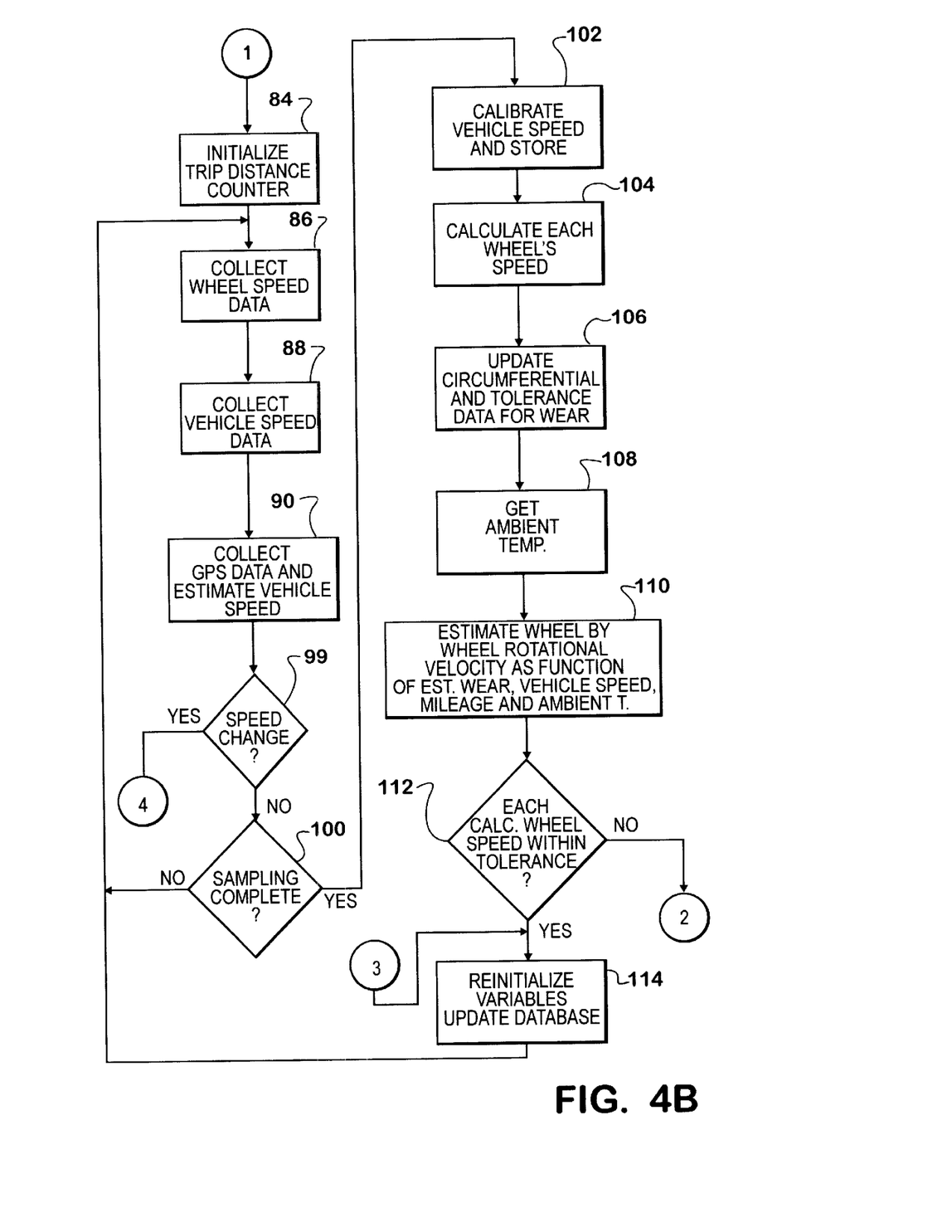
Figure 4C:
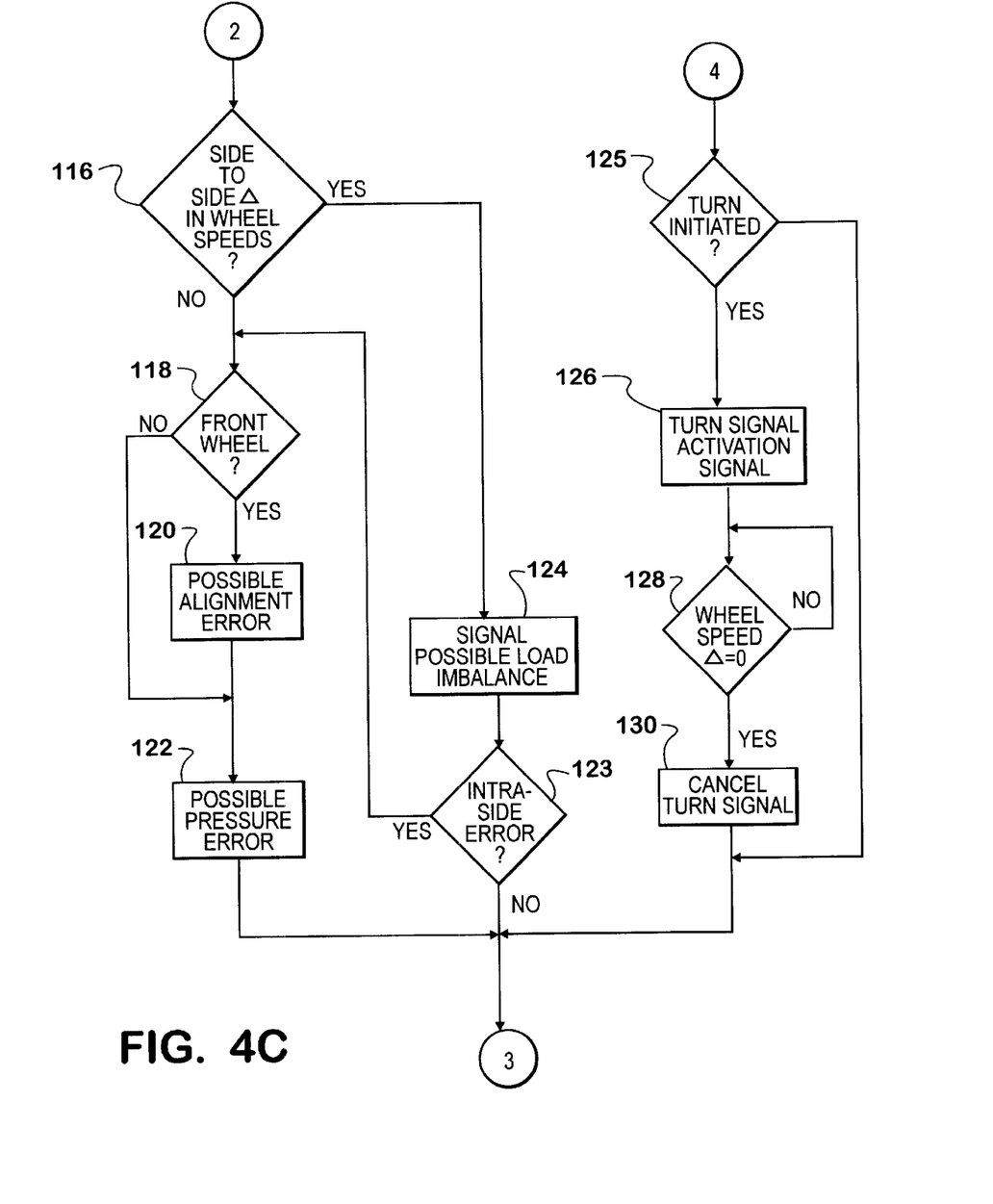

Referring now to FIGS. 4A–C, a flow chart is described illustrating one method for practicing the invention adapted to serve as an algorithm executable on a computer 42. Those skilled in the art will recognize that the sequence of steps of the program is subject to considerable rearrangement without changing the essence of the processes. The program is initiated upon starting step 60 the vehicle on which the wheel and tire monitoring system is installed. It is immediately determined, from operator input on I/O interface 50, if new tires have been installed. If not, processing branches to step 84 along the NO branch from decision box 62. If new tires have been installed calibration of the tires is required and processing follows the YES branch. The calibration of any new or replacement tires 30 requires the data inputs described above, including the expected rolling radius of the tire at each wheel position, the wear factor expected for that position and the tolerances the rolling radius must meet.

A tire, if out of round, will exhibit a variable rolling radius. A variable rolling radius results in the wheel on which the out of round tire is mounted exhibiting a varying rotational velocity profile. At step 70 the rotational velocity profile for each wheel is examined. If one or more wheels is out of round it is determined at decision step 70 and the NO branch (i.e. No to the question, are wheel speeds constant?) is taken to step 78 where a warning is issued that one or more tires 30 suffer from a possible out of round condition. Processing is then indicated as terminating at step 79, indicating opportunity for remedial action to be taken before calibration is resumed.

If wheel speeds are constant at the outset of calibration then the YES branch is taken from decision step 70 to decision step 72. At decision step 72 the rotational velocity for each wheel is compared with the expected wheel velocity as determined from vehicle speed (derived from tachometer 40). The output from tachometer 40 is assumed to be equated to a vehicle speed based on knowledge of the rear end differential ratios and a standard wheel rolling radius, the latter of which is a characteristic which compromises tachometer 40's accuracy as an indication of vehicle speed. Measured wheel speeds should match, or fall within a predetermined margin of error of the estimated speeds. If they do, the YES branch is taken from decision step 72 and scalars for each wheel are calculated to equate measured wheel rotational velocity to the estimate for wheel rotational velocity derived from vehicle velocity at step 80. After the scalars are calculated, a database on the tires 30 and the scalars calculated at step 80 is flagged as usable. At step 82 an odometer is initialized which records the distance traveled on the tires. Where fewer than the entire set of tires is replaced, individual odometers may be set for each wheel. Processing than can continue to step 84 for normal operational processing.

Wheel rotational velocities which are constant, but out of tolerance, do not necessarily indicate any one problem, although the circumstances under which the deviant rotational velocities occur exhibit a correlation with certain compromised tire, or wheel, operating characteristics. Frequently, a deviation from predicted wheel rotational velocity indicates a deviation from tire rated pressure. However, during mounting of tires it is probable that the tires were correctly pressurized for the calibration test. Under these circumstances other possible problems should be considered and are highlighted through the portion of the algorithm occurring following the NO branch from decision step 72.

Among the problems which may be present are an alignment problem which can occur with either of the front wheels 34 and 36. Accordingly, along the NO branch from decision step 72 it is determined if the wheels exhibiting unexpected rotational velocities are front wheels. If not, processing advances along the NO branch to step 77 where an indication of a tire out of tolerance warning is issued. If a wheel exhibiting an out of tolerance variation from expected rotational velocity is a front wheel then the YES branch is taken to step 76 allowing signaling of a possible alignment error. From step 76 processing continues to step 77 to allow generation of a possible tire size outside tolerance signal to be generated. Step 77 may also be taken as possible indication of an incorrect entry of data, which would also require correction. From step 77 processing is terminated by step 79 to allow corrective steps to be made.

Operational monitoring of wheel and tire condition begins at step 84. The accuracy of certain measurements is enhanced by estimating operational tire temperature, the formula for the generation of which utilizes the distance traveled on the current trip. Step 84 provides for initialization of a trip odometer to provide this input. Initially, data points are collected for several variable inputs. Among the variable inputs developed are measured wheel speed, vehicle speed, and, if available, positional data provided by a global positioning sensor unit. The data sampling is represented as a sequence of steps 86, 88 and 90. Sampling continues until statistically significant accumulations of data have been collected (step 100). Positional data is collected to provide a measurement of straight line distance traveled against time. This data is used to generate a vehicle velocity measurement which can be used to calibrate the vehicle speedometer, and in part compensate for distortions introduced into the speed measurement by wear of the tires or inadequate inflation of tires mounted on the drive wheels 22, 24, 26 and 28. A sufficient number of data points is collected from GPS 48 to provide a more accurate measurement of vehicle speed than is provided by the tachometer 40. Speed during data sampling is monitored and if a deviation from a consistent speed is detected sampling is aborted at step 99 due to possible initiation of a turn.

Once a statistically significant sample set has been collected processing of the data begins. At step 102 the signals from the GPS (if available) are used to calibrate the instantaneous measurement of vehicle speed. Next, at step 104, the rotational velocity of each wheel is calculated. At step 106 the odometer is interrogated to retrieve the distance traveled on the tires at each wheel location. This figure is used to update the estimate of each tire's rolling radius and to update the allowable variation in that diameter. Tire characteristics are also a function of tire temperature, which, as is well known, can increase pressure. Tire temperature is indirectly calculated from the distance traveled on the instant trip, or since the last prolonged stop and ambient temperature. From these calculations an estimate for the rotational velocity for each vehicle wheel is generated from the estimated wear, estimated tire temperature and vehicle speed. The estimated and measured wheel rotational speeds are compared at step 112 to determine if the differences between measured values and estimated values are within tolerances. If the differences are within tolerances, processing is returned to step 86 to collect another data set along the YES branch from decision step 112. The return loop includes a variable reinitialization and update step 114.

Certain diagnostic processes require tracking certain designated variables for longer periods then each sample collection period. For example, a running tally of wheel rotations, and relative wheel speed during a trip may be maintained for comparison with the other wheels to detect situations that develop during a trip that might otherwise falsely indicate a pressurization problem. These values may be updated at step 114.

The NO branch from decision step 112 advances the algorithm to a series of diagnostic tests represented by steps 116–125. Initially it is determined if there is side to side pattern in the variation of wheel speeds, e.g. are wheels 22, 24 and 34 turning faster than expected compared to wheels 28, 26 and 36. Such a pattern can indicate that the vehicle is overloaded to one side, which may occur due to poor loading or shifts in a load during travel. It may be observed that this test is depicted as occurring only if some of the wheels have a rotational velocity outside of tolerances for the observed vehicle speed, which implies a minimum wheel rotational velocity variation as a threshold before an unbalanced load is indicated. This test can be moved ahead of the wheel speed out of range step 112, provided a set of threshold differences in side to side wheel rotational speed are applied. If load is off balance along the roll axis, wheels on one side of the vehicle will show a speed difference compared to wheels on the other side.

The NO branch from step 116 advances processing along a path where the likely cause of wheel rotational velocity is loss of tire pressure. At step 118 it is determined whether the wheel departing from norms is a front wheel. Whether it is or not, a warning is issued of a possible pressurization problem (step 122). If the wheel is a front wheel a second warning is issued also indicating the possibility that an alignment error may have developed (step 120).

Careful readers will note that multiple problems can occur simultaneously. For example, tire pressure may be low and the vehicle load out of balance. It is conceivable that a slow leak leading to developing low tire pressure could contribute to a shift in load, also putting a vehicle out of acceptable balance. Step 123 following step 124 may be used to detect the largest variation in wheel speed among wheels on one side of a vehicle for recomparison to its estimated rotational speed. A YES result at step 123 returns process execution to step 118. A NO result results in processing returning to step 114.

The system and method of the present invention must have a mechanism for distinguishing turns from load imbalances. A secondary benefit of the ability to detect the onset and termination of turns is the possibility of replacing the automatic cancellation mechanism for turn signals. A side to side variation in wheel speed may indicate an unbalanced load, or it may indicate that the vehicle is turning, in which case the inside wheels will turn more slowly than the outside wheels. Step 125, which follows along the YES branch from decision step 99 is used to determine occurrence of a turn. Turns are likely to occur as temporary side to side variations in wheel rotational velocity which span several sampling intervals. To determine the occurrence of a turn the mid-term wheel rotational velocity signals may be recalled to determine the persistence of the side to side variation. Along the YES branch from step 125, i.e. detection of a turn, step 126 may be provided to activate the turn signal if not on during a turn. At step 128 the difference in wheel speeds is compared until the side to side difference approaches 0. Cancellation of the signal follows that event after a brief time delay at step 130. Since data points collected in a turn are distorted processing is returned to step 114 to reset counters before the collection of a new set of data points.

The system and method of indirect tire pressure measurement using ABS wheel speed sensors of the present inventions has several advantages. Trucks require greater sensitivity of measurement due to the much higher sidewall stiffness of tires compared to automobile tires. Various drive train patterns are allowed for including both 4×6 and 6×10 wheel arrangements. Load imbalance, wheel alignment, out of specification tires and other problems are also handled.

While the invention is shown in only one of its forms, it is not thus limited but is susceptible to various changes and modifications without departing from the spirit and scope of the invention.

What is claimed is:

1. Apparatus for determining speed for a vehicle, comprising:
   a plurality of wheels;
   an anti-lock brake system including a rotational velocity signal generator for each of the plurality of wheels;
   a wheel speed averager for producing a raw average speed signal;
   a global position sensing unit providing vehicle positional data;
   means responsive to the rotational velocity signals for determining side to side variation in wheel speeds indicative of a turn;
   calibration means operating on the vehicle positional data in the absence of indication of a turn for generating a reference speed signal; and
   means taking the raw average speed signal and the reference speed signal as inputs, and using the speed reference signal to calibrate the raw average speed signal for generating a speedometer signal.

2. Apparatus as claimed in claim 1 wherein the wheel speed averager utilizes the rotational velocity signals as inputs.

3. Apparatus as claimed in claim 2, wherein the calibration means further operates on data inputs including initial tire size and tread depth.

4. Apparatus as claimed in claim 2, where the wheel speed averager includes a means for comparing the rotational velocity signal for any one wheel against an average speed of the remaining wheels and eliminating any one wheel if its rotational velocity departs from the average by more than allowable deviation.

5. A method of generating a speedometer signal for a vehicle having a plurality of wheels; comprising the steps of:
   generating rotational velocity signals for each of the plurality of wheels;
   developing a raw speed signal from at least a set of the plurality of wheels;
   periodically determining vehicle position from a global position system;
   determining the occurence of vehicle turns responsive to side to side variation in the rotational velocity signals;
   using the vehicle positional data in the absence of indication of a turn for generating a speed reference signal; and
   generating a speedometer signal using the raw speed signal calibrated by the speed reference signal.

6. A method as claimed 5 wherein the step of developing a raw speed signal operates on the rotational velocity signals.

7. A method as claimed in claim 6, wherein the generating step further calibrates the raw speed signal based on data inputs including initial tire size and tread depth.

8. A method as claimed in claim 7, further comprising comparing the rotational velocity signal for any one wheel against an average speed of the remaining wheels and eliminating any one wheel if its rotational velocity departs from the average by more than allowable deviation.

* * * * *